(12) United States Patent
Orubor (10) Patent No.: US 9,822,520 B2
(45) Date of Patent: Nov. 21, 2017

(54) TOILET WITH FLUSHABLE OVERFLOW DRAIN

(71) Applicant: Lawrence Orubor, Calgary (CA)

(72) Inventor: Lawrence Orubor, Calgary (CA)

( * ) Notice: Subject to any disclaimer, the term of this patent is extended or adjusted under 35 U.S.C. 154(b) by 33 days.

(21) Appl. No.: 14/824,563

(22) Filed: Aug. 12, 2015

(65) Prior Publication Data
US 2016/0047113 A1 Feb. 18, 2016

Related U.S. Application Data

(60) Provisional application No. 61/999,983, filed on Aug. 12, 2014.

(51) Int. Cl.
*E03D 11/18* (2006.01)
*E03D 11/13* (2006.01)
*E03D 11/00* (2006.01)

(52) U.S. Cl.
CPC .............. *E03D 11/13* (2013.01); *E03D 11/00* (2013.01)

(58) Field of Classification Search
CPC ................................ E03D 11/00; E03D 11/13
USPC ........................................................... 4/427
See application file for complete search history.

(56) References Cited

U.S. PATENT DOCUMENTS

| | | | | |
|---|---|---|---|---|
| 3,262,132 A | * | 7/1966 | Mann | E03D 11/00 4/427 |
| 4,028,747 A | * | 6/1977 | Newton | E03D 5/016 4/317 |
| 6,944,892 B1 | * | 9/2005 | Giolas | E03D 11/00 4/427 |
| 9,309,659 B2 | * | 4/2016 | Stack | E03D 11/13 |

* cited by examiner

*Primary Examiner* — Huyen Le
(74) *Attorney, Agent, or Firm* — Stephen Lewellyn; Lewellyn Law, PLLC (57) ABSTRACT

A toilet with a flushable overflow drain includes a bowl and a primary drain connected to the bowl to receive fluid therefrom and having a primary drain trap. An overflow drain including an overflow drain trap is connected to the bowl at one end thereof and is connected at a second end to the primary drain at a location downstream of the primary drain trap. An overflow drain flush passage is connected to the overflow drain at a position upstream of the overflow drain trap. Accordingly, water can be directed through the overflow drain flush passage and into the overflow drain to flush the overflow drain and the overflow drain trap free of debris to prevent clogging.

12 Claims, 9 Drawing Sheets

TOILET WITH FLUSHABLE OVERFLOW DRAIN

CROSS-REFERENCE TO RELATED APPLICATIONS

This application claims the benefit of U.S. Provisional Application No. 61/999,983, filed Aug. 12, 2014, the entire of which is incorporated herein by reference.

FIELD OF THE INVENTION

The present invention relates generally to toilets, and more particularly, relating to a toilet having a flushable overflow drain.

BACKGROUND OF THE INVENTION

It is known to provide a toilet with an overflow drain to prevent the toilet from overflowing when the primary drain becomes clogged. Typically, the overflow drain is configured to bypass the p-trap of the primary drain. Accordingly, to prevent sewer gases from passing through the overflow drain, the overflow drain may also include a p-trap. The overflow drain p-trap is prone to clogging by the accumulating of debris and residue, especially during an overflow event where the contents of the toilet bowl are directed through the overflow drain. However, unlike the primary drain p-trap, which is typically cleared during each flush, the overflow drain trap is not similarly flushed to clear any accumulated debris and residue. Accordingly, there is a need and desire for a new toilet construction that includes a flushable overflow drain.

SUMMARY OF THE INVENTION

In view of the foregoing problems with conventional toilets having overflow drains, embodiments of the present invention provide a toilet with a flushable overflow drain to permit flushing the overflow drain to remove accumulated debris and to prevent clogging of the overflow drain.

In general, in one aspect, a toilet with a flushable overflow drain is provided that includes a bowl and a primary drain connected to the bowl to receive fluid therefrom and having a primary drain trap. An overflow drain including an overflow drain trap is connected to the bowl at one end thereof and is connected at a second end to the primary drain at a location downstream of the primary drain trap. An overflow drain flush passage is connected to the overflow drain at a position upstream of the overflow drain trap. Accordingly, water can be directed through the overflow drain flush passage and into the overflow drain to flush the overflow drain and the overflow drain trap free of debris to prevent clogging.

In general, in another aspect, the toilet may include a first valve at a first junction between the overflow drain and the overflow drain flush passage and a second valve at a second junction between the overflow drain and the primary drain.

In general, in another aspect, the toiler may include a water tank connected to the overflow drain flush passage and a flush valve disposed within the tank and connected to the coupling between the water tank and the overflow drain flush passage.

In general, in another aspect, a toilet with a flushable overflow drain is provided that includes a bowl and a primary drain connected to the bowl and to receive fluid therefrom and having a primary drain trap. An overflow drain including an overflow drain trap is connected to the bowl at one end thereof and is connected at a second end to the primary drain at a location downstream of the primary drain trap. An overflow drain flush passage is connected to the overflow drain at a position upstream of the overflow drain trap and a toilet bowl flush passage is connected to the bowl. The overflow drain flush passage and the toilet bowl flush passage are separately connectable to a supply of water.

In general, in another aspect, a water tank is separately connected to the overflow drain flush passage and the toilet bowl flush passage. A first flush valve disposed within the tank and connected to the coupling between the water tank and the toilet bowl flush passage and a second flush valve disposed within the tank and connected to the coupling between the water tank and the overflow drain flush passage.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. No attempt is made to show structural details of the embodiments in more detail than is necessary for a fundamental understanding of the invention, the description taken with the drawings making apparent to those skilled in the art how the several forms of the invention may be embodied in practice. In the drawings.

DETAILED DESCRIPTION OF THE INVENTION

Figure 1:
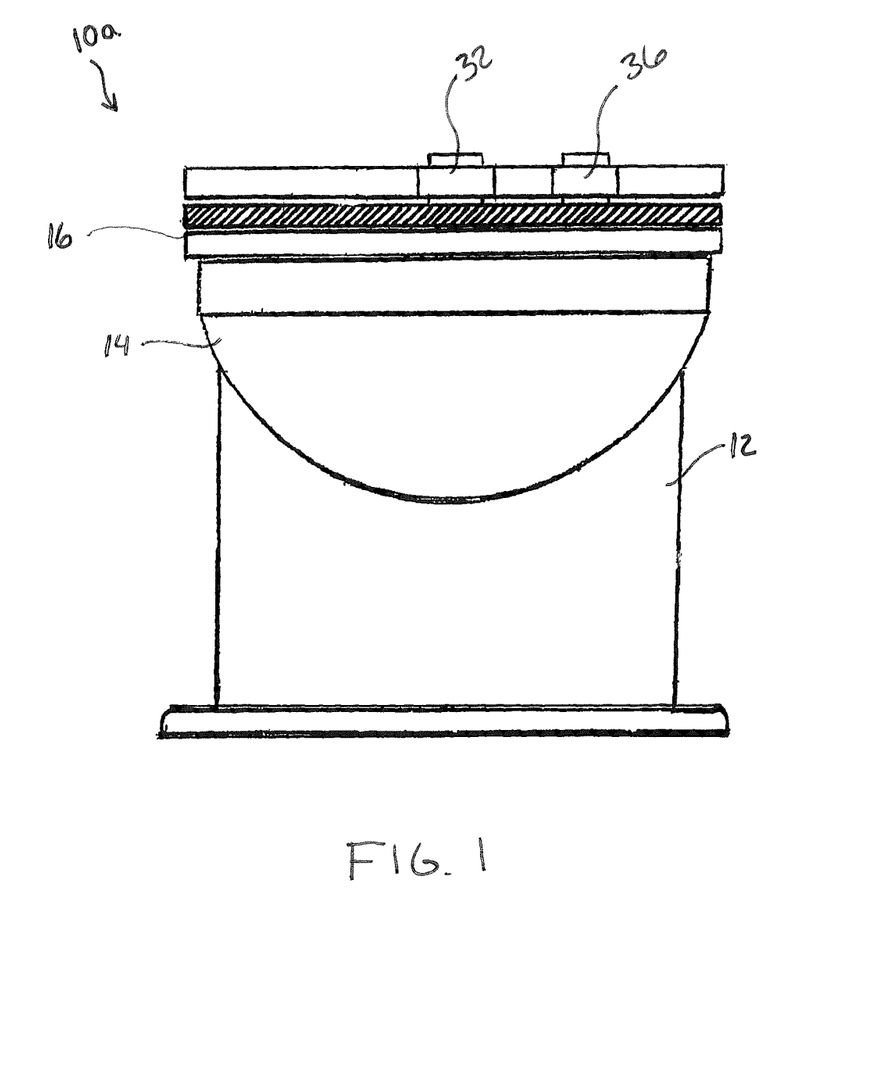
FIG. 1 is a diagrammatic front elevation view of a toilet with flushable overflow drain constructed in accordance with the principles of an embodiment of the present invention.
Figure 2:
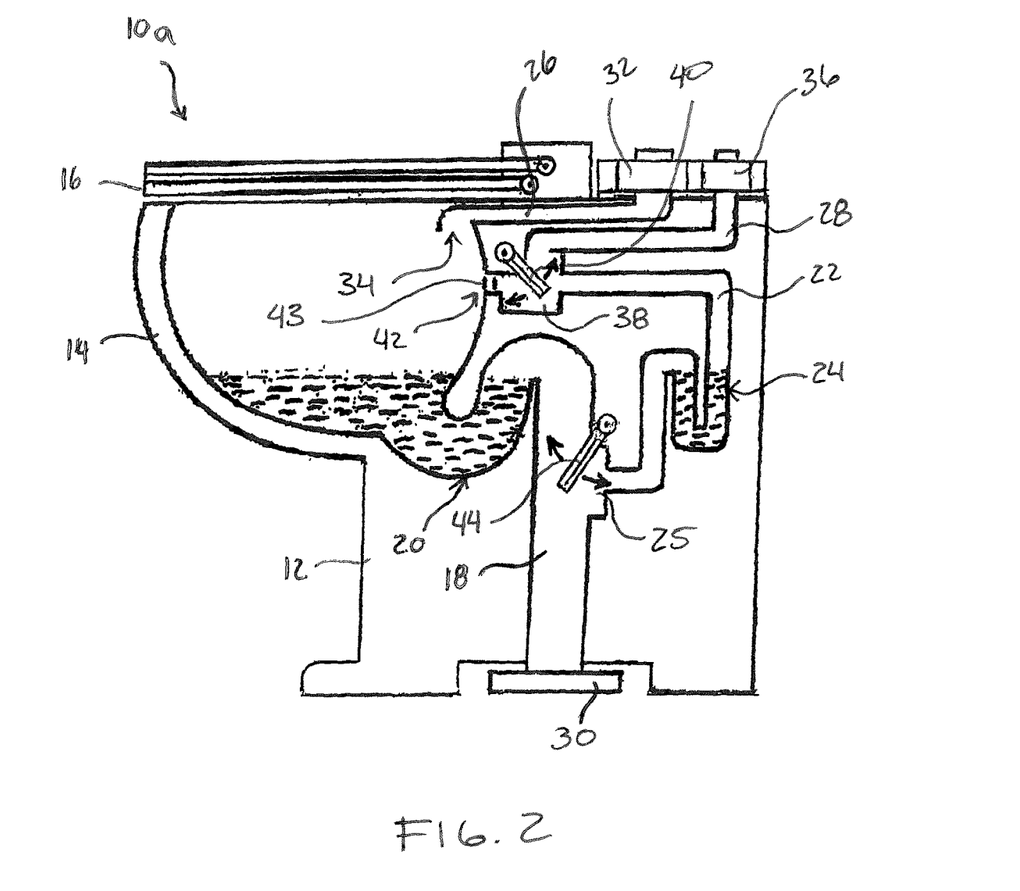
FIG. 2 is a diagrammatic cross-sectional view of the toilet of FIG. 1.

Referring now to the drawings, and more particularly to FIGS. 1-2, diagrammatically shown therein and designated by the reference number 10a is a first embodiment of the present toilet with flushable overflow drain. In the embodiment shown, toilet 10a is conventionally configured with a pedestal 12, a toilet bowl 14 that is supported upon the pedestal, and a seat 16 that is pivotally attached to the toilet.

In the depicted embodiment, toilet 10a includes a primary drain 18 with p-trap 20, an overflow drain 22 with a p-trap 24, toilet bowl flush passage 26, and an overflow drain flush passage 28. The primary drain 18 conventionally connects the bottom of the toilet bowl 14 to a waste line (not shown) via flange 30 to discharge waste from the bowl to the waste line. The overflow drain 22 connects the toilet bowl 14 to the primary drain 18, by-passing the p-trap 20 of the primary drain. More particularly, one end of the overflow drain 22 is connected to the bowl 14 at a position above the primary drain 18 and the other end of the overflow drain is connected to the primary drain at a position downstream of p-trap 20 at junction 25, thus by-passing p-trap 20. While not shown here, in other embodiments, the overflow drain 22 may be connected to the waste line separate from the primary drain 18.

The toilet bowl flush passage 26 is fitted at one end with a coupling 32 for connection to a source of water and is connected at the opposite end to the toilet bowl 14 by one or more discharge openings 34. To this end, water flowing through the toilet bowl flush passage 26 is discharged into the toilet bowl, such as, for example, during flushing. The overflow drain flush passage 28 is fitted at one end with a coupling 36 for connection to a source of water and is connected at the opposite end to the overflow drain 22 at junction 38. A valve 40, such as, for example, a flap valve is provided at junction 38. Valve 40 operates alternately to seal the overflow drain passage 28 from the overflow drain 22 when fluid flows through the inlet 42 of the overflow drain and to seal the inlet and direct water flowing in the overflow flush passage 28 into the overflow drain, rather than being discharged into the toilet bowl 14 through the inlet. Further, inlet 42 may be fitted with a grill 43 to block large debris from flowing into the overflow drain 22.

Similarly, in the depicted embodiment, junction 25 is provided with a directional valve 44, such as, for example, a flap valve. Valve 44 operates alternately to seal the overflow drain 22 from the primary drain 18 when fluid flows through the primary drain and to seal the primary drain from the overflow drain when fluid flows through the overflow drain.

Figure 3:
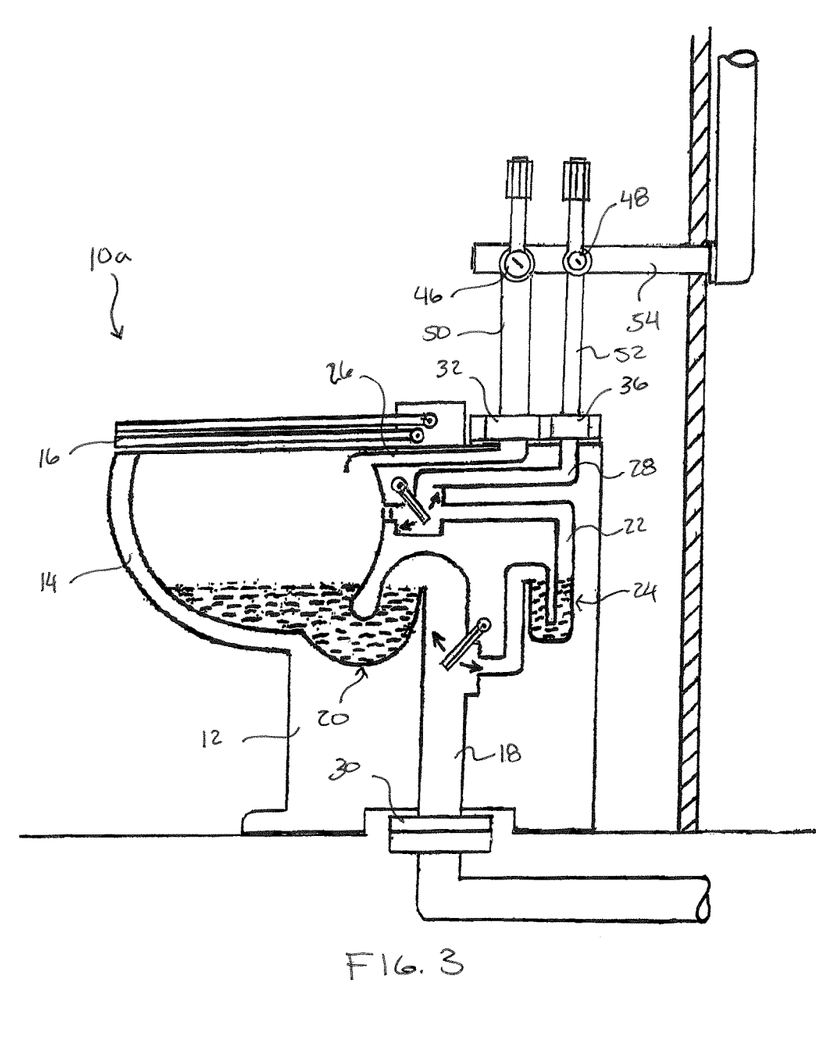
FIG. 3 is a diagrammatic cross-sectional view of the toilet of FIG. 1, shown installed in a tankless configuration.

Turning now to FIG. 3, toilet 10a is representatively shown installed in a first configuration. In the depicted configuration, toilet 10a is connected in a tankless configuration where coupling 32 of the toilet bowl flush passage 26 and coupling 36 of the overflow drain passage 28 are connected to a source of pressurized water 54 by separate flush valves 46 and 48, respectively, via supply piping 50 and 52.

Figure 4:
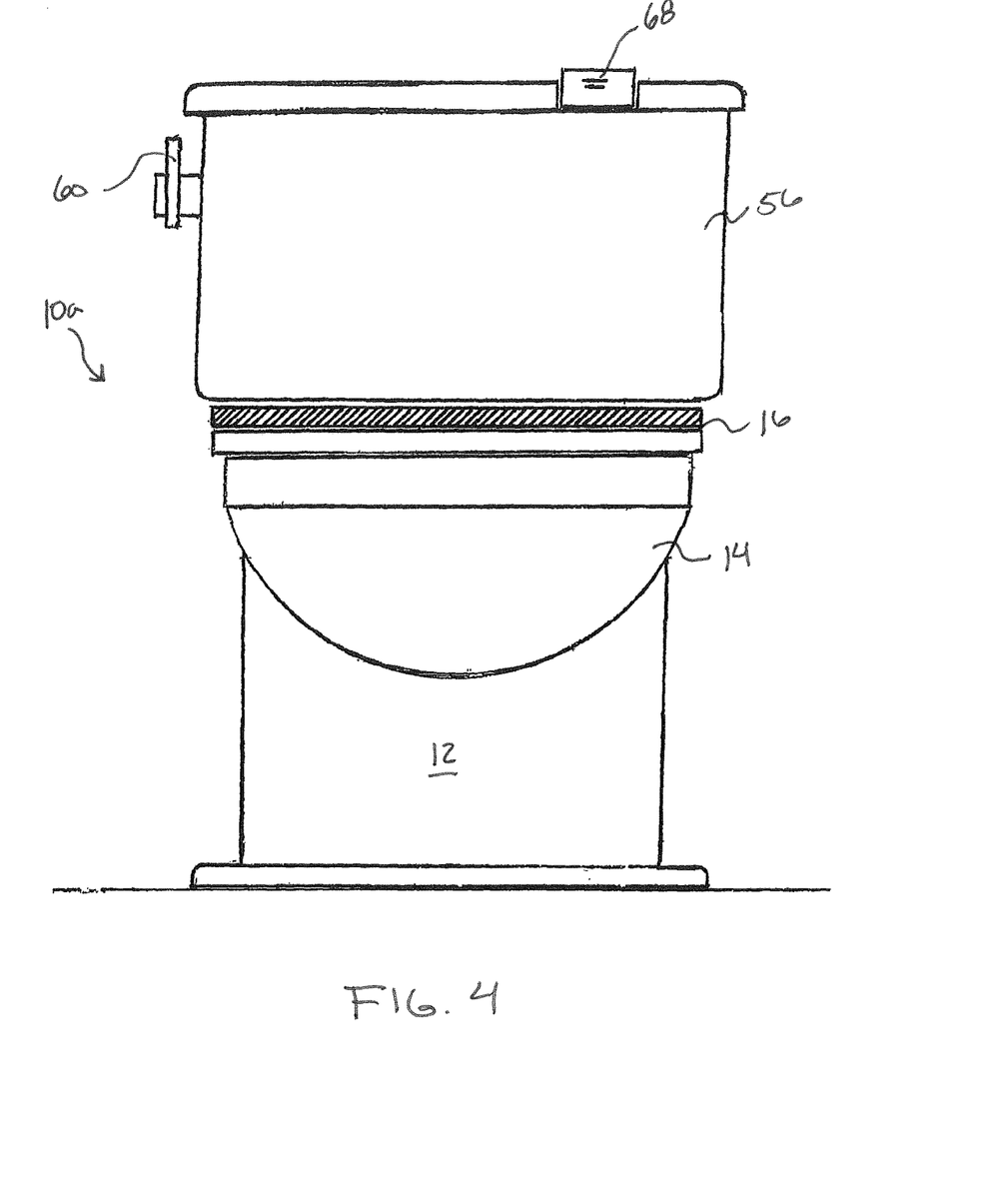
FIG. 4 is a diagrammatic front view of the toilet of FIG. 1, shown with a water tank.
Figure 5:
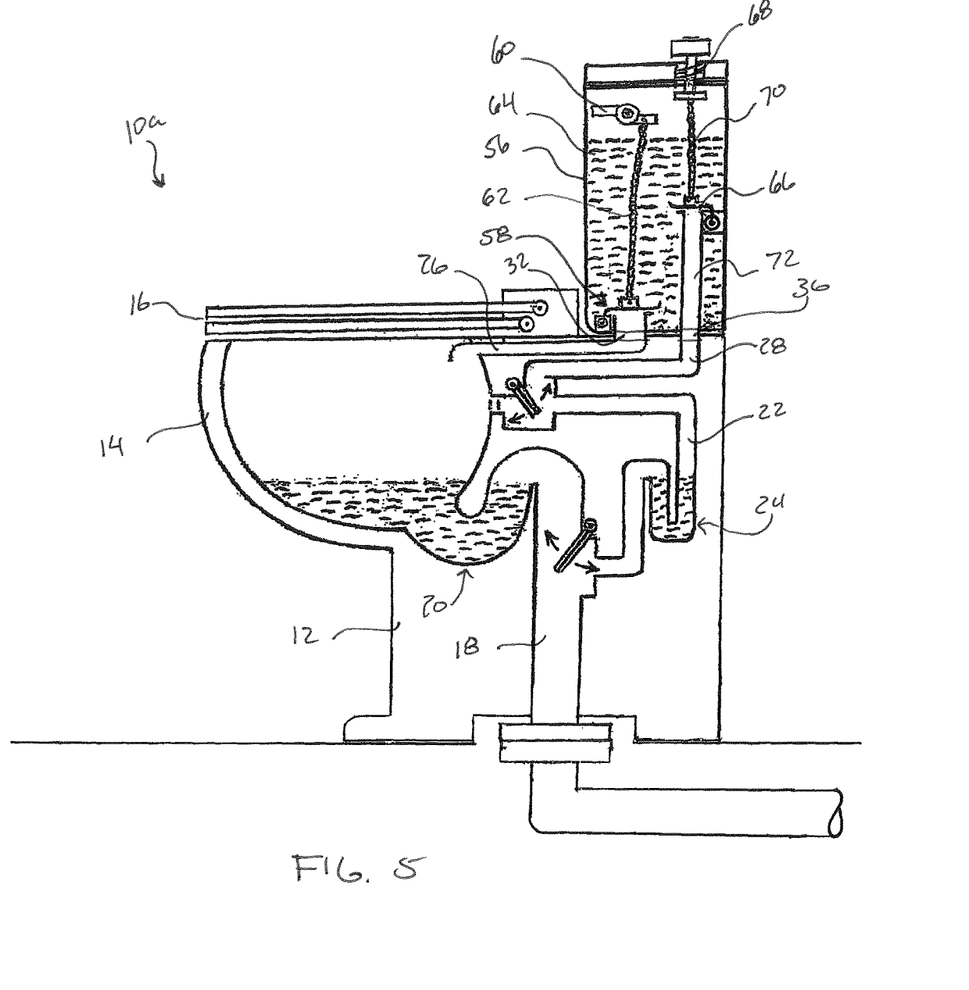
FIG. 5 is a diagrammatic cross-sectional view of the toilet of FIG. 1, shown with a water tank.

Turning now to FIGS. 4 and 5, toilet 10a is representatively shown installed in a second configuration. In the depicted configuration, toilet 10a includes a water tank 56 that is connected and supported upon the toilet. While not shown, water tank 56 would conventionally include a fill valve that is connected to the water supply via a supply tube to fill the tank with water.

In the depicted configuration, the toilet bowl flush passage 26 is connected to the water tank 56 by coupling 32. A main flush valve 58 is disposed within the tank and is connected to the coupling between the water tank and the toilet bowl flush passage. The main flush valve 58 is connected to a flush lever 60 via chain 62, such that rotating lever 60 causes the valve 58 to open, thereby causing water 64 contained in the tank 56 to flow through the toilet bowl flush passage 26. Further, in the depicted configuration, the overflow drain flush passage 28 is connected to the water tank 56 by coupling 36. A secondary flush valve 66 is disposed within the tank and is connected to the coupling between the water tank and the overflow drain flush passage. The secondary flush valve 66 is connected to a lever 68 by link 70, such that operation of the operator causes the valve 66 to open, thereby causing water 64 to flow through the overflow drain flush passage 28. As further depicted, secondary flush valve 66 is elevated higher than main flush valve 58 by a longer stand pipe 72, which has the effect to using less water when flushing the overflow drain 22.

Figure 6:
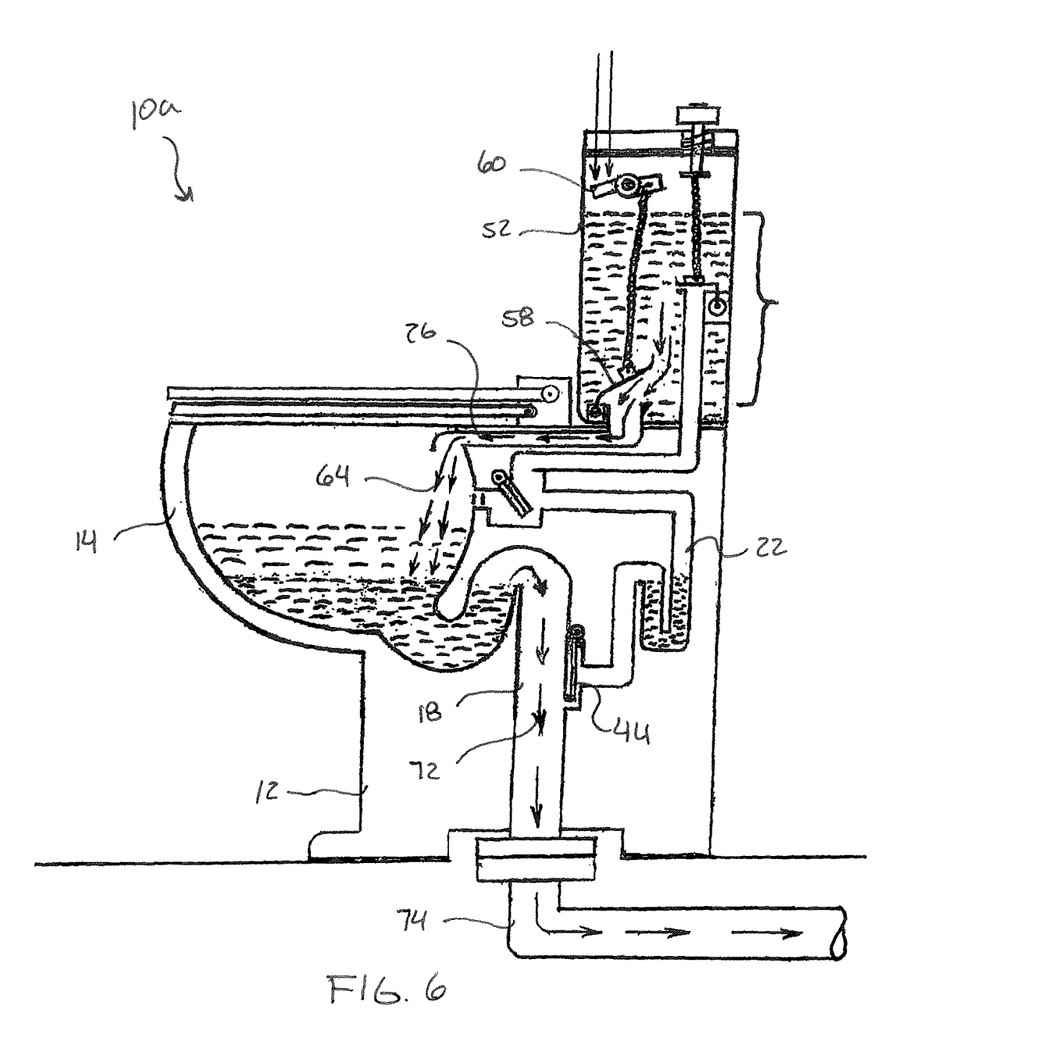
FIG. 6 is a diagrammatic cross-sectional view of the toilet of FIG. 1, shown with a water tank and operating in a typical flush operation.
Figure 7:
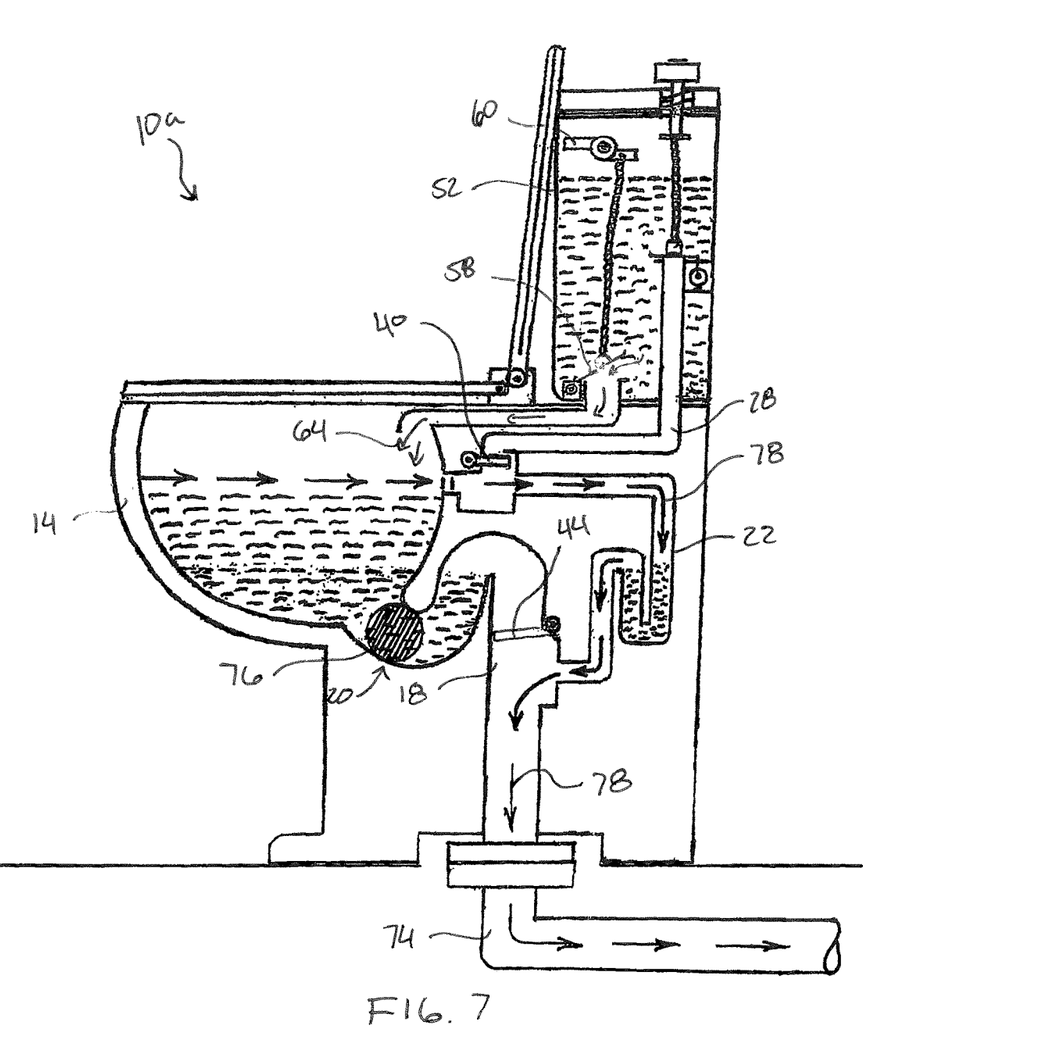
FIG. 7 is a diagrammatic cross-sectional view of the toilet of FIG. 1, shown with a water tank and in an overflow situation.
Figure 8:
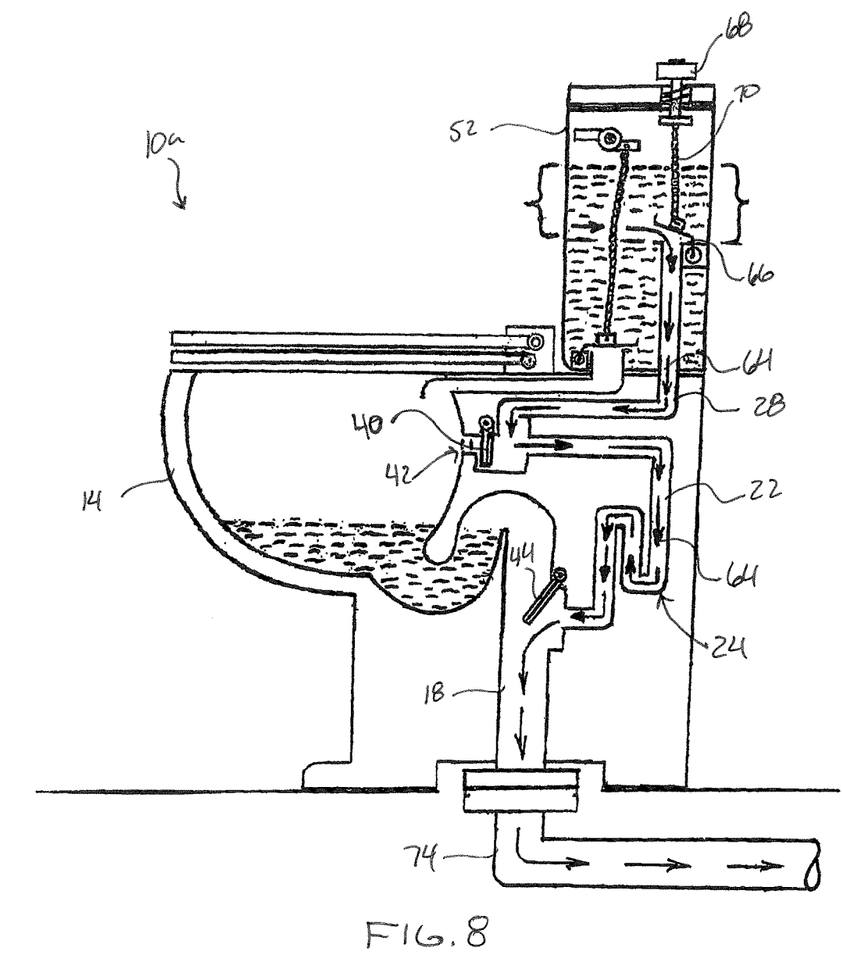
FIG. 8 is a diagrammatic cross-sectional view of the toilet of FIG. 1, shown with a water tank and in an overflow drain flushing operation.

Turning now to FIGS. 6-8, operation of toilet 10a will be described, with initial reference to FIG. 6. In FIG. 6, toilet 10a is shown in a typical flushing operation where the primary drain 18 is free and open (i.e., not clogged). Like a conventional toilet, in the normal flushing operation, a user operates lever 60 to open main flush valve 58 and discharge water 64 from the water tank 52 through toilet bowl flush passage 26 and into the bowl 14. The contents 72 of the bowl 14 are then subsequently discharged through primary drain 18 and into waste line 74. Further, as depicted, the flow of contents 72 through the primary drain 18 closes valve 44 and seals the overflow drain 22 from the primary drain.

In FIG. 7, toilet 10a is shown in an overflow situation where the primary drain 18 is blocked by blockage 76. Here, upon operating lever 60 to flush the bowl 14, as described above, the blockage 76 prevents contents 72 from flowing through the primary drain 18. Accordingly, overflow is prevented by fluid 78 flowing through the overflow drain 22 into the primary drain 18 by-passing p-trap 20, and then from the primary drain into the waste line 74. As further depicted, fluid 78 flowing through the overflow drain 22 operates valve 40 and seals the overflow drain from the overflow drain flush passage 28. Similarly, fluid 78 flowing through the overflow drain 22 operates valve 40 to connect the overflow drain with the primary drain 18.

In FIG. 8, toilet 10a is shown in a typical overflow drain flushing operation. Here, a user operates lever 68 to open secondary flush valve 66 and discharge water 64 from the water tank 52 through overflow drain flush passage 28 and into the overflow drain 22. The water 64 continues to flow through the overflow drain 22, flushing debris from the overflow drain and its p-trap 24 into the primary drain 18, where it then flows into the waste line 74. As further depicted, water flowing from the overflow drain flush passage 28 operates valve 40 and seals the inlet 42 of the overflow drain 22 and connects the overflow drain flush passage and the overflow drain. Similarly, water 64 flowing through the overflow drain 22 operates valve 40 to connect the overflow drain with the primary drain 18.

Figure 9:
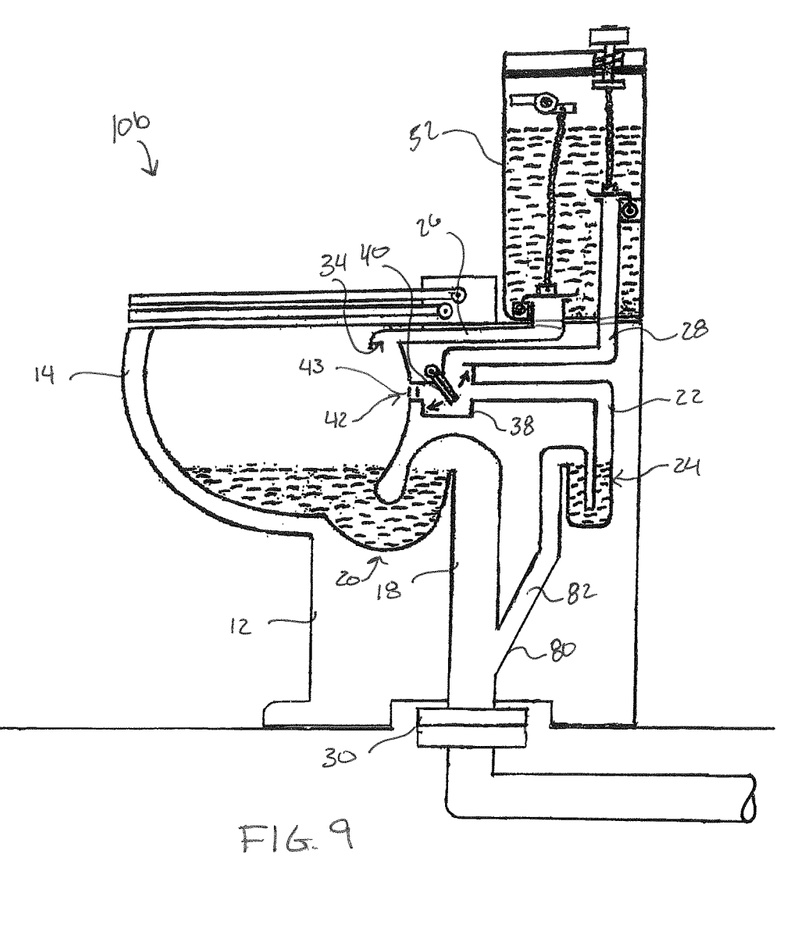
FIG. 9 is a diagrammatic cross-sectional view of a toilet with flushable overflow drain constructed in accordance with the principles of another embodiment of the present invention.

Turning now to FIG. 9, diagrammatically shown therein and designated by the reference number 10b is a second embodiment of the present toilet with flushable overflow drain. In this depicted embodiment, toilet 10b has substantially the same construction and operation of toilet 10a, except that valve 44 is eliminated and junction 25 is replaced with junction 80. As depicted, junction 80 includes a downwardly angled section 82 of the overflow drain 22 that connects to the primary drain 18. The downwardly angled section 82 prevents fluid flowing through the primary drain 18 from upwardly flowing into the overflow drain 22, and thus eliminates the need for valve 44. Further, this structure prevents siphoning of water from the p-trap 20 during downward movement of flush water from the toilet bowl.

A number of embodiments of the present invention have been described. Nevertheless, it will be understood that various modifications may be made without departing from the spirit and scope of the invention. Accordingly, other embodiments are within the scope of the following claims.

What is claimed is:

1. A toilet with flushable overflow drain, comprising:
a bowl;
a primary drain including a primary drain trap, said primary drain connected to said bowl and to receive fluid therefrom;
an overflow drain including an overflow drain trap, said overflow drain connected to said bowl at one end thereof and connected at a second end to said primary drain at a location downstream of said primary drain trap;
an overflow drain flush passage connected to said overflow drain at a position upstream of said overflow drain trap;
a first valve at a first junction between said overflow drain and said overflow drain flush passage; and
a second valve at a second junction between said overflow drain and said primary drain.

2. The toilet of claim 1, wherein said first and second valves are flap valves.

3. The toilet of claim 1, further comprising:
a water tank, said water tank connected to said overflow drain flush passage; and
a flush valve disposed within said tank and connected to the coupling between said water tank and said overflow drain flush passage.

4. The toilet of claim 1, further comprising:
a grill disposed across an inlet of said overflow drain.

5. A toilet with flushable overflow drain, comprising:
a bowl;
a primary drain including a primary drain trap, said primary drain connected to said bowl and to receive fluid therefrom;
an overflow drain including an overflow drain trap, said overflow drain connected to said bowl at one end thereof and connected at a second end to said primary drain at a location downstream of said primary drain trap;
an overflow drain flush passage connected to said overflow drain at a position upstream of said overflow drain trap;
a toilet bowl flush passage;
wherein said overflow drain flush passage and said toilet bowl flush passage being separately connectable to a supply of water
a first valve at a first junction between said overflow drain and said overflow drain flush passage; and
a second valve at a second junction between said overflow drain and said primary drain.

6. The toilet of claim 5, wherein said first and second valves are flap valves.

7. The toilet of claim 5, further comprising:
a water tank, said water tank separately connected to said overflow drain flush passage and said toilet bowl flush passage;
a first flush valve disposed within said tank and connected to the coupling between said water tank and said toilet bowl flush passage; and
a second flush valve disposed within said tank and connected to the coupling between said water tank and said overflow drain flush passage.

8. The toilet of claim 7, further comprising:
a grill disposed across an inlet of said overflow drain.

9. A toilet with flushable overflow drain, the toilet having bowl and a primary drain connected to the bowl and the primary drain include including primary drain trap, the toilet comprising:
an overflow drain including an overflow drain trap, said overflow drain connected to said bowl at one end thereof and connected at a second end to said primary drain at a location downstream of said primary drain trap;
an overflow drain flush passage connected to said overflow drain at a position upstream of said overflow drain trap;
a first valve at a first junction between said overflow drain and said overflow drain flush passage; and
a second valve at a second junction between said overflow drain and said primary drain.

10. The toilet of claim 9, wherein said first and second valves are flap valves.

11. The toilet of claim 9, further comprising:
a water tank, said water tank connected to said overflow drain flush passage; and
a flush valve disposed within said tank and connected to the coupling between said water tank and said overflow drain flush passage.

12. The toilet of claim 9, further comprising:
a grill disposed across an inlet of said overflow drain.

* * * * *